US011544161B1

(12) United States Patent
Yarlagadda et al.

(10) Patent No.: US 11,544,161 B1
(45) Date of Patent: Jan. 3, 2023

(54) IDENTIFYING ANOMALOUS SENSORS

(71) Applicant: Amazon Technologies, Inc., Seattle, WA (US)

(72) Inventors: Pradeep Krishna Yarlagadda, Redmond, WA (US); Jean-Guillaume Dominique Durand, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 550 days.

(21) Appl. No.: 16/428,048

(22) Filed: May 31, 2019

(51) Int. Cl.
| | |
|---|---|
| *G06F 11/16* | (2006.01) |
| *G01D 18/00* | (2006.01) |
| *G05D 1/00* | (2006.01) |
| *B64C 39/02* | (2006.01) |

(52) U.S. Cl.
CPC ........ *G06F 11/1608* (2013.01); *B64C 39/024* (2013.01); *G01D 18/00* (2013.01); *G05D 1/0077* (2013.01)

(58) Field of Classification Search
None
See application file for complete search history.

(56) References Cited

U.S. PATENT DOCUMENTS

| | | | | |
|---|---|---|---|---|
| 8,392,142 B1* | 3/2013 | Conner | ................. | G01R 33/022 701/525 |
| 9,942,262 B1* | 4/2018 | Horowitz | ............ | H04W 12/122 |
| 10,223,925 B2* | 3/2019 | Cutler | .................. | G08G 5/0039 |
| 2008/0255711 A1* | 10/2008 | Matos | .................. | G08G 5/0069 701/2 |
| 2009/0265054 A1* | 10/2009 | Basnayake | ........... | B60W 40/114 701/31.4 |
| 2010/0084287 A1* | 4/2010 | Teramoto | ........... | G01N 27/4067 205/785 |
| 2010/0324778 A1* | 12/2010 | Foster | ................ | G01D 5/34776 701/29.2 |
| 2012/0265037 A1* | 10/2012 | Bohm | .................... | G01D 18/00 600/309 |
| 2015/0192439 A1* | 7/2015 | Mihelich | ................ | G01D 18/00 702/104 |
| 2016/0147225 A1* | 5/2016 | Sights | .................. | G05D 1/0221 701/23 |
| 2017/0123035 A1* | 5/2017 | Clark | .................... | G01R 35/005 |
| 2018/0096261 A1* | 4/2018 | Chu | ....................... | G06N 20/20 |
| 2018/0100784 A1* | 4/2018 | Patil | .................... | G05B 23/0281 |
| 2018/0320645 A1* | 11/2018 | McQuillen | ............ | F02D 41/222 |

FOREIGN PATENT DOCUMENTS

| | | | | | |
|---|---|---|---|---|---|
| WO | WO-2017045141 A1 | * | 3/2017 | ........... | B64C 39/024 |
| WO | WO-2019066841 A1 | * | 4/2019 | ......... | G05B 19/4183 |

* cited by examiner

*Primary Examiner* — Maceeh Anwari
*Assistant Examiner* — Jacob Daniel Underbakke
(74) *Attorney, Agent, or Firm* — Lee & Hayes, P.C.

(57) ABSTRACT

A sensor system may include first and second sensors configured to be coupled to a vehicle and generate respective first and second sensor signals indicative of operation of the vehicle. The sensor system may also include a sensor anomaly detector including an anomalous sensor model configured to receive the first and second sensor signals and determine that one or more of the first sensor or the second sensor is an anomalous sensor generating inaccurate sensor data. The sensor system may also be configured to identify one or more of the first sensor or the second sensor as the anomalous sensor generating inaccurate sensor data.

20 Claims, 6 Drawing Sheets

IDENTIFYING ANOMALOUS SENSORS

BACKGROUND

A vehicle may include sensors coupled to the vehicle and configured to generate sensor signals indicative of operation of the vehicle and indicative of the environment through which the vehicle travels. The vehicle may rely on sensor data included in the sensor signals for control and/or navigation of the vehicle. In some instances, one or more of the sensors may fail to generate sensor signals or may generate sensor signals that are insufficiently accurate to be useful for control or navigation of the vehicle. This may result from a failure related to the sensor itself or from environmental conditions in which the vehicle is operating. If such sensors are not identified, it may result in errors in controlling or navigating the vehicle, which may be detrimental to operation of the vehicle.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
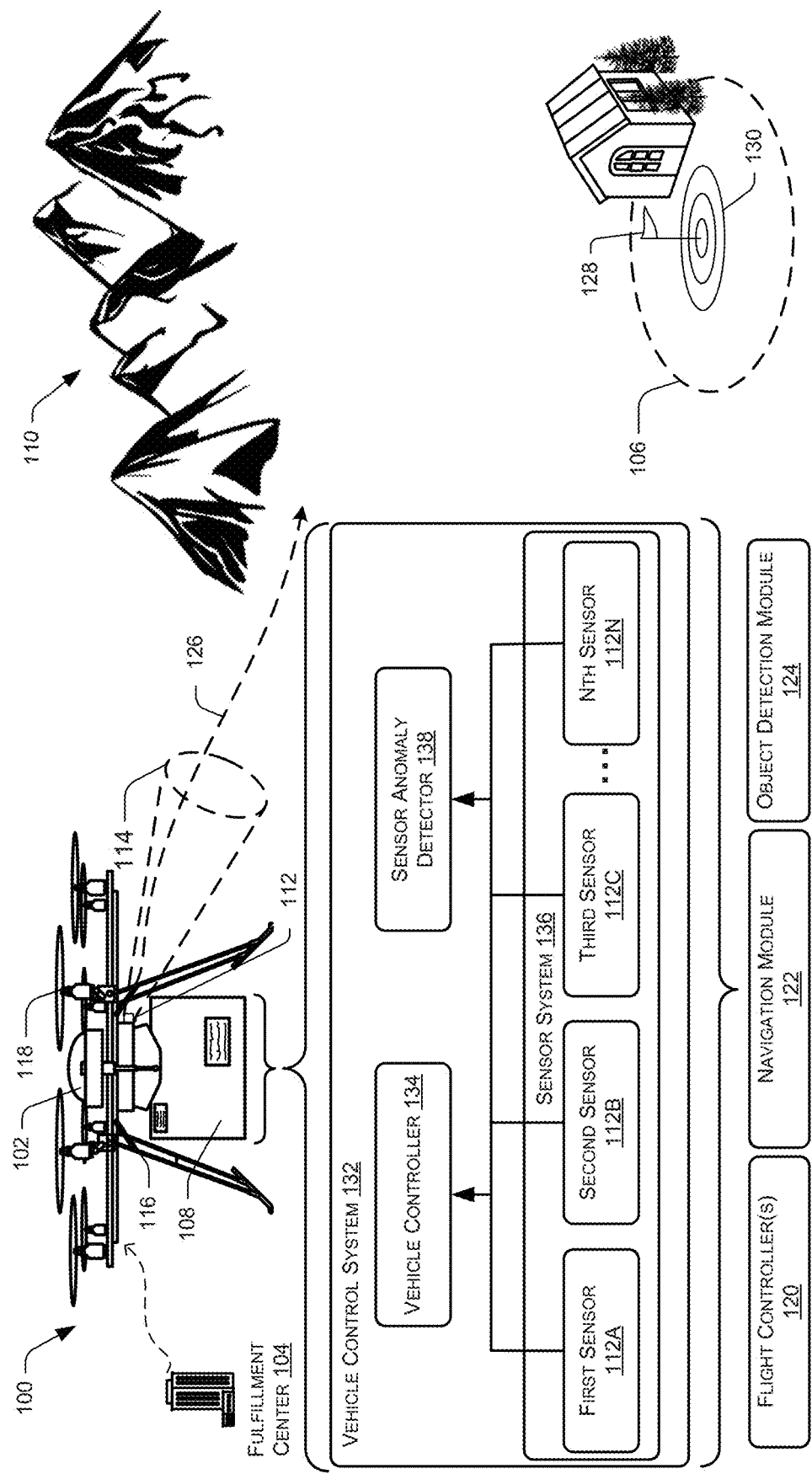
FIG. 1 is a schematic diagram of an illustrative environment that includes an unmanned aerial vehicle (UAV) including an illustrative vehicle control system.

This disclosure is generally directed to a system and method for identifying an anomalous sensor in a sensor system for a vehicle. For example, the vehicle may include a sensor system including a plurality of sensors configured to generate sensor signals indicative of operation of the vehicle and indicative of an environment through which the vehicle travels. The vehicle may also include a vehicle control system in communication with the sensor system, and the vehicle control system may be configured to at least partially control operation of the vehicle based at least in part on the sensor signals. In some examples, in order to prevent inaccurate sensor signals from interfering with the intended operation of the vehicle, the sensor system may include a sensor anomaly detector in communication with one or more of the sensors and configured to identify an anomalous sensor, such as, for example, a sensor that is not generating sensor signals or that is generating sensor signals that are insufficiently accurate to be used by the vehicle control system for controlling operation of the vehicle. In some examples, the sensor anomaly detector may include an anomalous sensor model trained via, for example, machine learning, to determine that inaccurate sensor data is being generated by one or more of the sensors. For example, the anomalous sensor model may be trained using training data derived from sensor data recorded during operation of the vehicle, and during which sensors coupled to the vehicle are generating accurate sensor signals. In some examples, the anomalous sensor model may learn correlations between the sensor signals generated by different sensors during operation of the vehicle, so that the correlations may be used during future operations of the vehicle, or a similar vehicle, to determine whether one or more of the sensors is generating sensor signals that indicate that one or more of the sensors is an anomalous sensor generating inaccurate sensor data. In some examples, the sensor anomaly detector may be configured to use identification techniques to identify the one or more sensors that are generating sensor signals including inaccurate sensor data.

In some examples, a vehicle control system may include a vehicle controller configured to receive sensor signals from a sensor system and at least partially control operation of the vehicle. The vehicle control system may also include a sensor system in communication with the vehicle controller. The sensor system, in some examples, may include a first sensor configured to be coupled to the vehicle and generate first sensor signals indicative of operation of the vehicle and/or indicative of an environment through which the vehicle travels, and a second sensor configured to be coupled to the vehicle and generate second sensor signals indicative of the operation of the vehicle and/or indicative of the environment through which the vehicle travels. The sensor system may also include a sensor anomaly detector in communication with the first sensor and the second sensor. In some examples, the sensor anomaly detector may include an anomalous sensor model, which, in some examples, may include a mathematical model trained via machine learning. For example, the anomalous sensor model may leverage one or more of supervised or semi-supervised learning, reinforcement learning, feature learning, anomaly detection learning, decision tree learning, association rule learning, and/or take the form of an artificial neural network, a support vector machine, and/or genetic algorithms. In some examples, the anomalous sensor model may be configured to receive the first sensor signals and the second sensor signals, and determine, based at least in part on the first sensor signals and the second sensor signals, that one or more of the first sensor or the second sensor is an anomalous sensor generating inaccurate sensor data (e.g., data deviating from data obtained from normal sensor operation and/or no sensor data at all). In some examples, the anomalous sensor model may generate a confidence level representative of a probability that either (1) there is an inconsistency in the sensor data indicative of inaccurate sensor data generated by one or more of the sensors, or (2) the sensor data is consistent and indicative of a lack of inaccurate sensor data generated by the sensors. In some examples, the confidence level may be represented as a percentage and/or another scoring paradigm. In some examples, the sensor anomaly detector may be configured to generate a sensor fault signal indicative of the anomalous sensor. In some examples, the sensor fault signal may be generated based on the confidence level exceeding, or falling below, a threshold confidence level, and in some examples, the threshold confidence level may be tailored to a desired safety factor and/or other considerations.

In some examples, the vehicle may be an unmanned aerial vehicle (UAV), and the vehicle controller, upon receipt of the sensor fault signal, may be configured to prevent take-off of the UAV or cause the UAV to land. In some examples in which the vehicle is a UAV, the vehicle controller, upon receipt of the sensor fault signal, may be configured to cause the UAV to perform a maneuver, and the sensor anomaly detector may be configured to identify the anomalous sensor based at least in part on the first sensor signals generated during the maneuver and the second sensor signals generated during the maneuver.

In some examples, identifying one or more of the first sensor or the second sensor as the anomalous sensor generating inaccurate sensor data (e.g., data deviating from data obtained from normal sensor operation and/or no sensor data at all) may include monitoring the first sensor signals during a first time period, monitoring the first sensor signals during a second time period, and determining a first sensor signal difference between the first sensor signals during the first time period and the first sensor signals during the second time period. In some such examples, the sensor anomaly detector may be configured to identify the first sensor as the anomalous sensor based at least in part on the first sensor signal difference being greater than a threshold magnitude, which may be an indication, for example, that the first sensor is generating first sensor signals in an unstable manner (e.g., the magnitude of the first sensor signals is fluctuating in a manner inconsistent with normal and/or proper operation of the first sensor).

In some examples, the sensor system may include a third sensor configured to be coupled to the vehicle and generate third sensor signals indicative of the operation of the vehicle and/or indicative of an environment through which the vehicle is travelling. In some such examples, the sensor anomaly detector may be configured to identify as the anomalous sensor the first sensor, the second sensor, and/or the third sensor. For example, identifying the anomalous sensor may include monitoring during a first time period the first sensor signals and the second sensor signals (e.g., while not monitoring the third sensor signals), monitoring during a second time period the second sensor signals and the third sensor signals (e.g., while not monitoring the first sensor signals), and monitoring during a third time period the first sensor signals and the third sensor signals (e.g., while not monitoring the second sensor signals). The sensor anomaly detector, in some examples, may be configured to identify the first sensor, the second sensor, and/or the third sensor as the anomalous sensor generating inaccurate sensor data (e.g., data deviating from data obtained from normal sensor operation and/or no sensor data at all), based at least in part on the monitoring during the first time period, the monitoring during the second time period, and the monitoring during the third time period. For example, the sensor anomaly detector may be configured to identify the anomalous sensor (e.g., from among the first sensor, the second sensor, and the third sensor) by determining, for example, that the first sensor signals are inconsistent with the second sensor signals during the first time period, determining that the first sensor signals are inconsistent with the third sensor signals during the third time period, and determining that the second sensor signals are consistent with the third sensor signals during the second time period. In such an example, the sensor anomaly detector may be configured to identify that the first sensor is the anomalous sensor generating inaccurate sensor data, for example, by a process of elimination. In some examples, one or more of the first time period, the second time period, or the third time period may at least partially overlap (e.g., fully overlap). In some examples, one or more of the first time period, the second time period, or the third time period may be sequential and/or consecutive.

In some examples, maneuvering the vehicle may be used to determine whether a sensor is an anomalous sensor. For example, the first sensor signals may include first sensor data indicative of a first maneuver of the vehicle, and the second sensor signals may include second sensor data indicative of the first maneuver of the vehicle. In some examples, the sensor anomaly detector may be configured to determine that the first sensor data is inconsistent with the second sensor data. In some such examples, the vehicle controller may be configured to receive the sensor fault signal and control operation of the vehicle based at least in part on the sensor fault signal, for example, to determine which of the first sensor or the second sensor is the anomalous sensor. For example, the vehicle controller may be configured to receive the first sensor signals, the second sensor signals, and the sensor fault signal from the sensor system, and cause, upon receipt of the sensor fault signal, the vehicle to perform a second maneuver. In some such examples, the sensor anomaly detector may be configured to identify the anomalous sensor based at least in part on the first sensor signals generated during the second maneuver and the second sensor signals generated during the second maneuver, for example, one or more of which may be inconsistent with the respective sensor signals expected during the second maneuver.

In some examples, the sensor system may be used to recalibrate a sensor that is generating signals indicative of a lack of, or change in, calibration. For example, the first sensor may be identified as the anomalous sensor and further, the first sensor may be identified as lacking calibration. In some such examples, the vehicle controller may be configured to cause the vehicle to perform a maneuver, and the sensor anomaly detector may be configured to recalibrate the first sensor based at least in part on, for example, a previous correlation between the first sensor signals and the second sensor signals, the first sensor signals generated during the maneuver, and the second sensor signals generated during the maneuver.

The techniques and systems described herein may be implemented in a number of ways. Example implementations are provided below with reference to the following figures.

FIG. 1 is a schematic diagram of an illustrative environment 100 that includes a UAV 102 configured to travel through the environment 100. Although FIG. 1 depicts a UAV 102, other vehicles may incorporate one or more of the systems described herein, such as land vehicles (cars, trucks, etc.), marine vehicles (boats, ships, etc.), and/or other types of aircraft.

The example environment 100 includes a fulfillment center 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, and electrical power towers and power wires.

The UAV 102 may be equipped with one or more sensors 112, at least some of which may provide a field of view 114, which may be used for guidance and/or navigation. For example, the sensors 112 may be configured to generate sensor signals indicative of operation of the UAV 102 and/or the environment 100 through which the UAV 102 is travelling. The sensors 112 may enable detection of obstacles to avoid, detect an objective marker, assist with navigation, and/or for other reasons. The UAV 102 may, at times, conduct autonomous flight using information captured by the sensors 112.

The UAV 102 may be equipped with a number of components to enable the UAV 102 to perform operations during the delivery of the package 108. For example, the UAV 102 may include a frame 116 and a propulsion system 118 coupled to the frame 116 and configured to propel the UAV 102 through the environment 100. The components may also include one or more flight controllers 120, a navigation module 122, and an object detection module 124, as well as other components discussed below with reference to FIGS. 2-5. For example, the UAV 102 may travel under control of the flight controller(s) 120 and along the flight path 126 toward the destination 106. The flight controller(s) 120 may receive data from the navigation module 122 to assist the flight controller(s) 120 with following the flight path 126 to arrive at the destination 106. The flight controller(s) 120 may continually, or from time to time, provide controls to cause change in a velocity of the UAV 102, a change in heading, a change in altitude, a change in orientation, and/or other changes (e.g., pitch, roll, yaw, hover, etc.), for example, based at least in part on data received from the navigation module 122. In addition, the UAV 102 may execute different controls based on different flight scenarios, such as a takeoff stage, a transport stage, a package deposit stage, and/or a landing stage of flight.

The object detection module 124 may identify objects in data captured by the sensors 112, which may be used to inform the flight controller(s) 120, and for other reasons, such as to provide communications to the object or to a central command, etc. For example, the object detection module 124 may identify objective markers 128 via analysis of data captured by the sensors 112. The objective markers 128 may be associated with a waypoint, a drop zone 130 for the destination 106, and/or associated with other locations.

As shown schematically in FIG. 1, the UAV 102 may include a vehicle control system 132 for at least partially controlling operation of the UAV 102, for example, as explained in more detail herein. For example, the vehicle control system 132 may include a vehicle controller 134 in communication with a sensor system 136, for example, including a plurality of the sensors 112, and configured to receive sensor signals from the sensor system 136 and at least partially control operation of the UAV 102. Although shown as being incorporated into the vehicle control system 132 in the example shown in FIG. 1, the sensor system 136 may be separate from the vehicle control system 132.

In the example shown, the vehicle control system 132 may also include a sensor anomaly detector 138 in communication with the sensor system 136 and configured to receive sensor signals from one or more of the sensors 112 of the sensor system 136. In some examples, the sensor anomaly detector 138 may be incorporated into the sensor system 136. In some examples, the sensor anomaly detector 138 may be separate from and in communication with the vehicle control sysyem 132. The sensor anomaly detector 138 may be configured to receive sensor signals from one or more of the sensors 112 and identify an anomalous sensor generating inaccurate sensor data (e.g., a sensor not generating sensor signals, generating sensor signals that are insufficiently accurate to assist with control of operation of the UAV 102, or generating sensor signals that are inconsistent with expected sensor signals from the respective sensor during normal and/or proper operation). For example, the sensor system 136 may include a first sensor 112A, a second sensor 112B, a third sensor 112C, through an Nth sensor 112N, and the sensor anomaly detector 138 may be in communication with any combination (or all) of the sensors 112A-112N and receive sensor signals from the combination (or all) of the sensors 112A-112N. In some examples, the sensor anomaly detector 138 may be configured to identify that one or more of the sensors 112 is an anomalous sensor, for example, a sensor not generating sensor signals, generating unexpected sensor data, and/or generating inaccurate sensor data. In some examples, one or more of the sensors 112A-112N may be a temperature sensor, an optical sensor (e.g., a single lens camera, a stereo camera, a multi-lens camera, a digital still camera, a red green blue (RGB) camera, a video camera, a thermographic camera, an infrared sensor or camera), a location sensor (e.g., a global positioning system (GPS)), an inertial measurement unit (IMU), an accelerometer, a gyroscope, a laser sensor (e.g., light detection and ranging (LIDAR) sensor), a sound navigation and ranging (SONAR) sensor, a radio detection and ranging (RADAR) sensor, or a pressure sensor.

Figure 2:
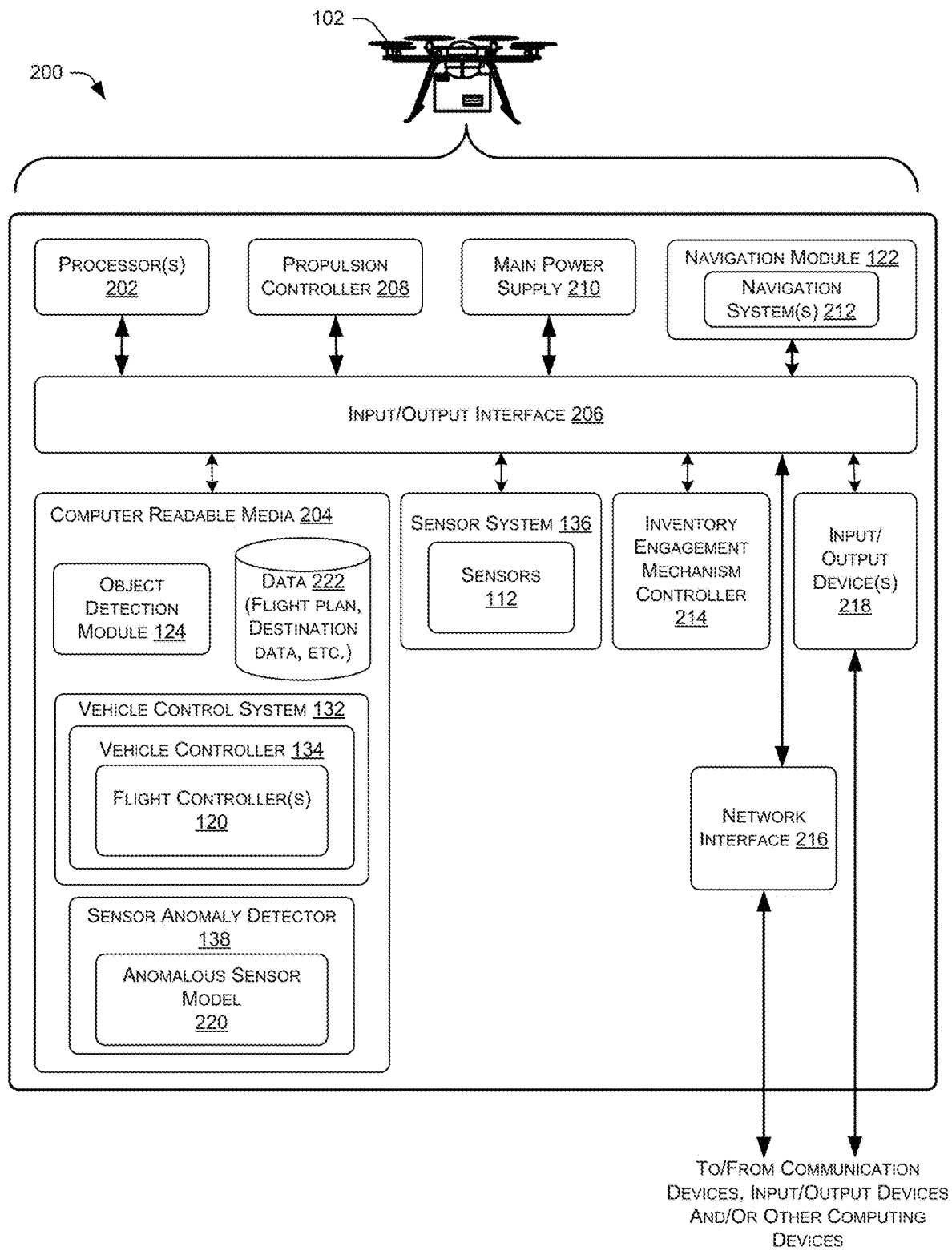
FIG. 2 is a block diagram of an illustrative UAV architecture of the UAV shown in FIG. 1.

FIG. 2 is a block diagram of an illustrative UAV architecture 200 of the example UAV 102. The UAV architecture 200 may be used to implement the various systems, devices, and techniques discussed above. In the illustrated implementation, the UAV architecture 200 includes one or more processors 202 coupled to a non-transitory computer readable media 204 via an input/output (I/O) interface 206. The UAV architecture 200 may also include a propulsion controller 208, a main power supply 210 (e.g., an electrical power supply) configured to supply power to the various powered systems of the UAV 102, and/or the navigation module 122. The navigation module 122 may include one or more navigation systems 212, such as, for example, a GPS, an inertial navigation system (INS), and/or a vision-aided navigation system (VAINS) to assist with determining the position and/or heading of the UAV 102. In some examples, the navigation system(s) 212 may include a system for determining the altitude of the UAV 102, such as, for example, a pressure sensor and/or altimeter. Other navigation systems are contemplated. The example UAV architecture 200 further includes an inventory engagement mechanism controller 214 to interact with the package 108, the sensor system 136, a network interface 216, and one or more input/output (I/O) devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In some implementations, the I/O interface 206 may be configured to coordinate I/O traffic between the processor(s) 202, the non-transitory computer readable media 204, and any peripheral devices, the network interface 216 or other peripheral interfaces, such as input/output devices 218. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

The propulsion controller 208 may be configured to communicate with the navigation module 122 and/or adjust the power of one or more propulsion devices of the propulsion system 118 (FIG. 1), such as, for example, propeller motors, to guide the UAV 102 along the flight path 126 (FIG. 1). The propulsion devices may be any known type of propulsion devices. The main power supply 210 may be configured to control the charging and any switching functions associated with one or more power modules (e.g., batteries) of the UAV 102.

As explained herein, the navigation module 122 may include systems to facilitate navigating the UAV 102 to and/or from a location. The inventory engagement mechanism controller 214 may be configured to communicate with actuator(s) and/or motor(s) (e.g., servo motor(s)) used to engage and/or disengage inventory, such as the package 108. For example, when the UAV 102 is positioned over a surface at a delivery location, the inventory engagement mechanism controller 214 may provide an instruction to a motor that controls the inventory engagement mechanism to release the package 108.

As shown in FIG. 2, the network interface 216 may be configured to allow data to be exchanged between the UAV architecture 200, other devices attached to a network, such as other computer systems (e.g., server(s)), and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The I/O devices 218 may, in some implementations, include sensors such, as accelerometers and/or other I/O devices commonly used in aviation. Multiple I/O devices 218 may be present and controlled by the UAV architecture 200. One or more of the sensors 112 may be utilized to assist in landings as well as avoiding obstacles during flight.

In some examples, the computer readable media 204 may store the vehicle control system 132 (e.g., including the vehicle controller 134 and/or the flight controller(s) 120), the sensor anomaly detector 138, which, in some examples, may include an anomalous sensor model 220, as described herein, and the object detection module 124. In some examples, the computer readable media 204 may also store the navigation module 122, which may include the navigation system(s) 212. The components may access and/or write data 222, which may include flight plan data, log data, destination data, image data, and object data, and so forth.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Figure 3:
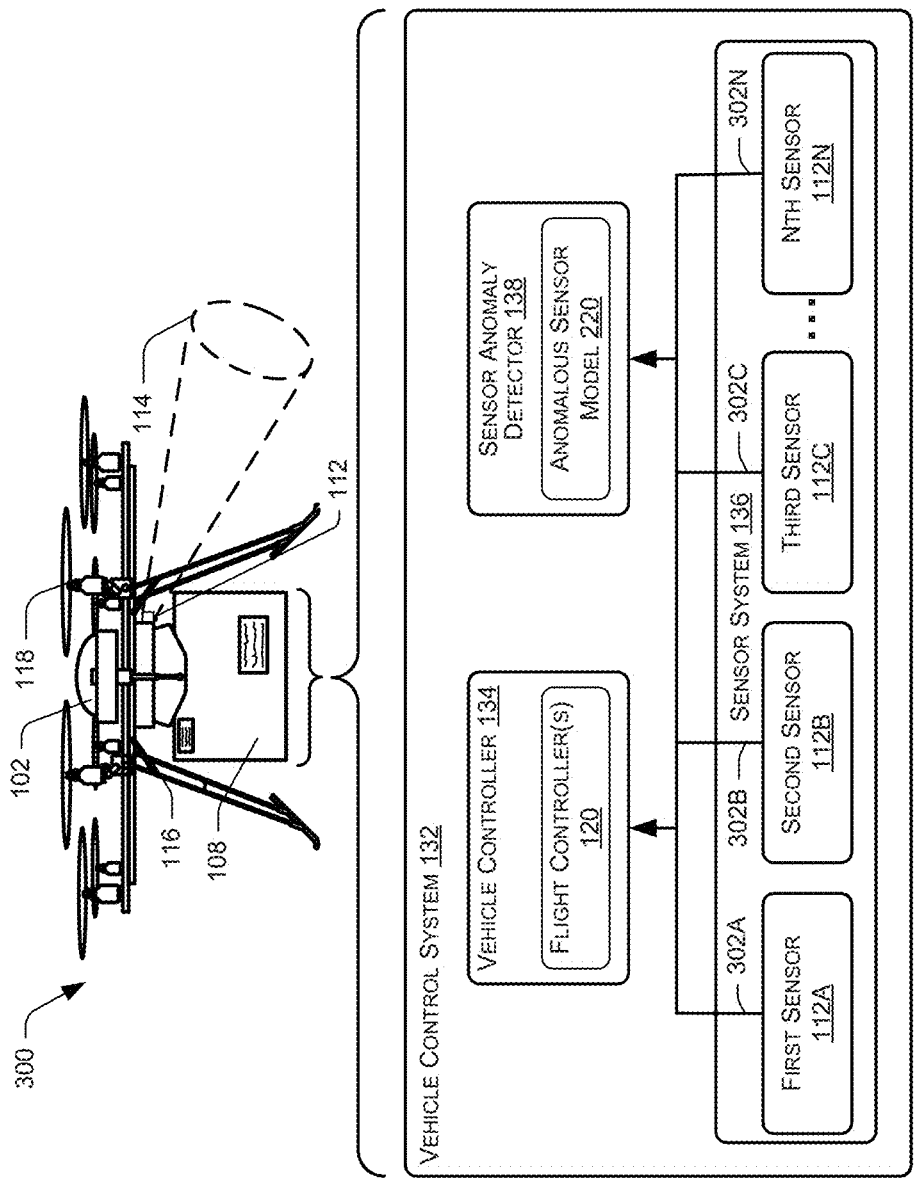
FIG. 3 is a block diagram of an illustrative architecture of an illustrative vehicle including an illustrative vehicle control system.

FIG. 3 is a block diagram of an illustrative architecture 300 of an illustrative vehicle (e.g., a UAV 102), including an illustrative vehicle control system 132. In the example shown, the vehicle control system 132 includes the vehicle controller 134, including one or more flight controller(s) 120. The example vehicle controller 134 is in communication with the example sensor system 136 and is configured to receive sensor signals 302 from the example sensor system 136 and at least partially control operation of the UAV 102. The example sensor system 136 includes a plurality of sensors 112 including a first sensor 112A, a second sensor 112B, a third sensor 112C, through an Nth sensor 112N, with each of the sensors 112A-112N coupled to the UAV 102 and configured to generate respective sensor signals indicative of operation of the vehicle and/or indicative of the environment through which the UAV 102 travels. The example vehicle control system 132 also includes an example sensor anomaly detector 138 in communication with the sensors 112. In the example shown, the sensor anomaly detector 138 includes an example anomalous sensor model 220, which, in some examples, includes an anomalous model trained via machine learning, for example, as explained herein. For example, the anomalous sensor model 220 may leverage one or more of supervised or semi-supervised learning, reinforcement learning, feature learning, anomaly detection learning, decision tree learning, association rule learning, and/or take the form of an artificial neural network, a support vector machine, and/or genetic algorithms.

In some examples, the anomalous sensor model 220 is configured to receive respective sensor signals 302A, 302B, 302C, through 302N from the respective sensors 112A, 112B, 112C, through 112N indicative of, for example, the environment through which the UAV 102 travels and/or operation of the UAV 102. Based at least in part on the respective sensor signals 302A-302N, the sensor anomaly detector 138 may be configured to determine, based at least in part on the sensor signals 302A-302N, that one or more of the sensors 112A-112N is generating inaccurate sensor data (e.g., data deviating from data obtained from normal sensor operation and/or no sensor data at all). For example, the sensors 112A-112N may include one or more of a temperature sensor, an optical sensor (e.g., a single lens camera, a stereo camera, a multi-lens camera, a digital still camera, a red green blue (RGB) camera, a video camera, a thermographic camera, an infrared sensor or camera), a location sensor (e.g., a global positioning system (GPS)), an inertial measurement unit (IMU), an accelerometer, a gyroscope, a laser sensor (e.g., light detection and ranging (LIDAR) sensor), a sound navigation and ranging (SONAR) sensor, a radio detection and ranging (RADAR) sensor, or a pressure sensor (e.g., an altimeter). One or more of the sensors 112A-112N may generate sensor signals 302A-302N indicative of operation of the UAV 102, which may include, for example, any UAV maneuver or operational status, such as, for example, being on the ground (or another surface) but neither in the process of landing nor taking-off, being on the ground but in the process of taking-off or landing, being in the air and being in the process of taking-off or landing, being in-flight and either cruising at a substantially constant altitude and/or direction, or being in-flight and ascending, descending, and/or changing direction of travel. In some examples, the vehicle control system 132, the flight controller(s) 120, the navigation module 122, and/or the object detection module 124 may be configured to determine a characteristic related to operation of the UAV 102 based on one or more of the sensor signals 302A-302N.

In some examples, the anomalous sensor model 220 may generate a confidence level representative of a probability that either (1) there is an inconsistency in the sensor data indicative of inaccurate sensor data generated by one or more of the sensors, or (2) the sensor data is consistent and indicative of a lack of inaccurate sensor data generated by the sensors. In some examples, the confidence level may be represented as a percentage and/or another scoring paradigm. In some examples, the anomalous sensor model 220 and/or the sensor anomaly detector 138 may be configured to generate a sensor fault signal indicative of the one or more anomalous sensors. In some examples, the sensor fault signal may be generated based on the confidence level exceeding, or falling below, a threshold confidence level, and in some examples, the threshold confidence level may be tailored to a desired safety factor and/or other considerations.

In some examples, upon generation of the sensor fault signal, the sensor anomaly detector 138 and/or the sensor system 136 may be configured to identify the one or more sensors generating inaccurate sensor data. In some examples, the sensor anomaly detector 138 and/or the sensor system 136 may be configured to determine, based at least in part on the characteristic associated with the operation of the UAV 102, expected respective sensor signals associated with the characteristic associated with the operation of the UAV 102 and the respective sensors 112A-112N. In some examples, the expected respective sensor signals may be associated with previous correlations between two or more of the respective sensor signals 302A-302N during normal operation of the respective sensors 112A-112N. For example, when the respective sensors 112A-112N are each generating accurate sensor signals during maneuvering of the UAV 102, the correlations exist between the respective sensor signals 302A-302N, depending on the characteristic associated with operation of the UAV 102, (e.g., the maneuvers and/or operations the UAV 102 is performing). These correlations may be recorded and/or stored in memory for later access.

For example, a plurality of sensors may be coupled to a UAV, and the UAV may be operated through various maneuvers and operations, during which the sensors generate respective sensor signals including sensor data. For example, sensors, such as a temperature sensor, an optical sensor, a location sensor (e.g., a GPS, an IMU, an accelerometer, a gyroscope, a laser sensor, a SONAR sensor, a RADAR sensor), and/or a pressure sensor (e.g., an altimeter) may be coupled to the UAV, and each of the sensors may generate respective sensor signals during the maneuvering and operation of the UAV. For example, a camera, a GPS, and an IMU may concurrently generate respective sensor signals during a flight sequence of the UAV, and thus create historical sensor data associated with the maneuvers and operations of the UAV during the flight sequence. The sensor signals may be stored and/or recorded, and each of the respective sets of sensor signals may be temporally aligned with one another, and/or temporally aligned with the maneuvers and operations of the UAV. Thereafter, the respective sets of sensor signals may be correlated with one another and/or the maneuvers and operations of the UAV to create sets of correlations between the respective sensor signals and UAV maneuvers and operations. This collection of data may be used, in some examples, by the sensor anomaly detector 138 and/or the sensor system 136 to determine which of the one or more of the sensors is generating data inconsistent with sensor data generated by one or more of the other sensors, which may be an indication that the inconsistent data is being generated by an anomalous sensor, for example, as described herein. In some examples, once the anomalous sensor model 220 has determined that there may be inaccurate sensor data being generated by one or more of the sensors, the sensor anomaly detector 138 and/or the sensor system 136 may identify the one or more sensors that are generating inaccurate sensor data, for example, as described herein.

In some examples, for a given characteristic associated with operation of the UAV 102, the previous correlations, recorded and/or stored during normal maneuvers and/or operation, may be used during a later-in-time maneuvering and/or operating of the UAV 102 to identify the real-time characteristic associated with operation of the UAV 102, which may be determined based on one or more of the respective sensor signals 302A-302N. Based on the real-time characteristic, the respective expected sensor signals from the respective sensors 112A-112N may be determined based on the previously-stored correlations between the respective sensor signals 302A-302N.

For example, the sensor anomaly detector 138 and/or the sensor system 136 may be configured to determine, based at least in part on the characteristic associated with the operation of the UAV 102 (e.g., a real-time characteristic), expected first sensor signals associated with the characteristic associated with the operation of the UAV 102, wherein the expected first signals are associated with a previous correlation between the first sensor signals 302A and the second sensor signals 302B. The sensor anomaly detector 138 and/or the sensor system 136 may also be configured to determine, based at least in part on the characteristic associated with the operation of the UAV 102, expected second sensor signals associated with the characteristic associated with the operation of the UAV 102, wherein the expected second sensor signals are associated with the previous correlation. For example, if the characteristic associated with operation of the UAV 102 is banking or rolling to the right (e.g., to initiate a turn to the right), and the first sensor is a camera, the sensor signals would be expected to indicate the horizon, and/or associated objects, is tilting up on the right side of the field of view of the camera. If the second sensor is a gyroscope, the second sensor signals would be expected to indicate rolling of the UAV 102 to the right.

In some examples, the sensor anomaly detector 138 and/or the sensor system 136 may also be configured to determine a first difference between the first sensor signals 302A and the expected first sensor signals and/or a second difference between the second sensor signals 302B and the expected second sensor signals. The sensor anomaly detector 138 and/or the sensor system 136 may also be configured to identify the first sensor 112A and/or the second sensor 112B as an anomalous sensor generating inaccurate sensor data, for example, based at least in part on the first difference and/or the second difference. In some examples, both the first sensor 112A and the second sensor 112B may be generating inaccurate sensor data, and in some examples, either the first sensor 112A or the second sensor 112B may be generating inaccurate sensor data. For example, if the characteristic associated with operation of the UAV 102 is banking or rolling to the right (e.g., to initiate a turn to the right), and the first sensor is a camera, the sensor signals would be expected to indicate the horizon, and/or associated objects, is tilting up on the right side of the field of view of the camera. Thus, if the sensor signals from the camera are not indicative of the horizon tilting up on the right as expected, this may be an indication that the sensor data from the camera is inaccurate. If the second sensor is a gyroscope, the second sensor signals would be expected to indicate rolling of the UAV 102 to the right, but if the sensor signals do not indicate rolling to the right, this may be an indication the sensor from the gyroscope is inaccurate.

In some examples, identifying the anomalous sensor may include determining that the first difference falls outside a first signal range, relative to the first expected sensor signals, indicative of the first sensor signals being accurate and/or that the second difference falls outside a second signal range, relative to the second expected signals, indicative of the second sensor signals being accurate. For example, the first sensor signal range and/or the second sensor signal range may range from, for example, between about zero percent and about plus-or-minus 5%, between about zero percent and about plus-or-minus 10%, between about zero percent and about plus-or-minus 15%, or between about zero percent and about plus-or-minus 20%.

In some examples, the anomalous sensor model 220, the sensor anomaly detector 138, and/or the sensor system 136 may be configured to generate a sensor fault signal indicative of the anomalous sensor. In some examples, the vehicle controller 134, upon receipt of the sensor fault signal, may be configured to prevent take-off of the UAV 102 or cause the UAV to land 102. For example, if the UAV 102 is in flight when the sensor fault signal is generated, the vehicle controller 134 may be configured to cause the flight controller 120 to initiate a landing, for example, an emergency landing, depending on whether the anomalous sensor is critical to continuation the flight of the UAV 102. If the anomalous sensor is not critical to continuation of the flight of the UAV 102, the initiated landing may be delayed until the UAV 102 reaches a desired location for landing and servicing or replacing the anomalous sensor. For example, if the UAV 102 includes two cameras with an at least partially overlapping field of view, as well as other guidance sensors, if one of the cameras is identified as anomalous and the other camera and guidance sensors are determined to be generating accurate sensor data, the UAV 102 may be maneuvered to a desired location for landing and servicing or replacing the camera. However, if the GPS is the anomalous sensor and no other sensor or group of sensors provide(s) a sustainable and/or reliable mode of navigation, this may constitute an emergency situation for which the UAV 102 may be landed immediately.

In some examples, the vehicle controller 134, upon receipt of the sensor fault signal, may be configured to cause the UAV 102 to perform a maneuver, for example, in order to identify the particular sensor that is generating inaccurate sensor data. By performing the maneuver, for example, a predetermined maneuver, the sensor anomaly detector 138 and/or the sensor system 136 may be configured to identify the anomalous sensor based at least in part on one or more of the sensor signals 302A-302N by comparing the one or more sensor signals 302A-302N to the previous correlations for the given maneuver, for example, as described herein. Any of the one or more sensor signals 302A-302N deviating from the expected sensor signals may indicate that such sensor signals are inaccurate and that the corresponding sensor(s) are anomalous sensor(s). For example, the sensor anomaly detector 138 may be configured to identify the anomalous sensor based at least in part on the first sensor signals 302A generated during the maneuver and the second sensor signals 302B generated during the maneuver during such an example process. For example, the maneuver may be one or a series of banking maneuvers to the left and to the right, which may cause one or more of the sensors 112A-112N to generate respective sensor signals 312A-312N that may be compared to respective expected sensor signals from the correlations.

In some examples, identifying that one or more of the respective sensors 112A-112N is an anomalous sensor generating inaccurate sensor data may include monitoring first sensor signals from a respective first sensor during a first time period, monitoring the first sensor signals during a second time period, and determining a first sensor signal difference between the first sensor signals during the first time period and the first sensor signals during the second time period. In some such examples, the sensor anomaly detector 138 and/or the sensor system 136 may be configured to identify the first sensor 112A as the anomalous sensor based at least in part on the first sensor signal difference being greater than a threshold magnitude, which may be an indication, for example, that the first sensor is generating first sensor signals 302A in an unstable manner (e.g., the magnitude of the first sensor signals 302A is fluctuating in a manner inconsistent with normal operation of the first sensor). For example, if a sensor generating signals indicative of altitude fluctuates rapidly in manner inconsistent with routine and/or possible maneuvering of the UAV 102, this may be an indication that the sensor is generating inaccurate sensor data.

In some examples, the sensor anomaly detector 138 may be configured to identify that one or more of the sensors 112A-112N is anomalous, for example, when the sensor system 136 includes three or more sensors 112. For example, the sensor system 136 may include the first sensor 112A, the second sensor 112B, and at least the third sensor 112C. In some such examples, the sensor anomaly detector 138 and/or the sensor system 136 may be configured to identify as the anomalous sensor the first sensor 112A, the second sensor 112B, and/or the third sensor 112C, etc. For example, identifying the anomalous sensor may include monitoring during a first time period the first sensor signals 302A and the second sensor signals 302B (e.g., while not monitoring the third sensor signals 302C), monitoring during a second time period the second sensor signals 302B and the third sensor signals 302C (e.g., while not monitoring the first sensor signals 302A), and monitoring during a third time period the first sensor signals 302A and the third sensor signals 302C (e.g., while not monitoring the second sensor signals 302B). The sensor anomaly detector 138 and/or the sensor system 136, in some examples, may be configured to identify the first sensor 112A, the second sensor 112B, and/or the third sensor 112C as the anomalous sensor generating inaccurate sensor data, based at least in part on the monitoring during the first time period, the monitoring during the second time period, and the monitoring during the third time period. For example, the sensor anomaly detector 138 and/or the sensor system 136 may be configured to identify the anomalous sensor (e.g., from among the first sensor 112A, the second sensor 112B, and the third sensor 112C) by determining, for example, that the first sensor signals 302A are inconsistent with the second sensor signals 302B during the first time period, determining that the first sensor signals 302A are inconsistent with the third sensor signals 302C during the third time period, and determining that the second sensor signals 302B are consistent with the third sensor signals 302C during the second time period. In such an example, the sensor anomaly detector 138 and/or the sensor system 136 may be configured to identify that the first sensor 112A is the anomalous sensor generating inaccurate sensor data, for example, by a process of elimination. In some examples, one or more of the first time period, the second time period, or the third time period may at least partially overlap (e.g., fully overlap). In some examples, one or more of the first time period, the second time period, or the third time period may be sequential and/or consecutive.

In some examples, if (1) sensor signals generated by a GPS are inconsistent with sensor signals generated by a camera, (2) the sensor signals generated by the GPS are inconsistent with sensor signals generated by an IMU, but (3) the sensor signals generated by the camera and the sensor signals generated by the IMU are consistent with one another, then, by the process of elimination, the GPS may be an anomalous sensor. The consistency/inconsistency between the respective sensor signals 302A, 302B, and 302C may be determined based on the previous correlations between the respective sensor signals 302A, 302B, and 302C. In addition, some examples of this example process may be extended and used to identify more than a single sensor that is generating inaccurate sensor data.

In some examples, maneuvering the UAV 102 may be used to determine whether a sensor is an anomalous sensor. For example, the first sensor signals 302A may include first sensor data indicative of a first maneuver of the UAV 102, and the second sensor signals 302B may also include second sensor data indicative of the first maneuver of the UAV 102. In some examples, the sensor anomaly detector 138 and/or the sensor system 136 may be configured to determine that the first sensor data is inconsistent with the second sensor data. In some such examples, the vehicle controller 134 may be configured to receive the sensor fault signal and control operation of the UAV 102 based at least in part on the fault signal, for example, to determine which of the first sensor 112A or the second sensor 112B is the anomalous sensor generating inaccurate sensor data. For example, the vehicle controller 134 may be configured to receive the first sensor signals 112A, the second sensor signals 112B, and the sensor fault signal from the sensor system 136, and cause, upon receipt of the sensor fault signal, the UAV 102 to perform a second maneuver. In some such examples, the sensor anomaly detector 138 and/or the sensor system 136 may be configured to identify the anomalous sensor based at least in part on the first sensor signals 112A generated during the second maneuver and the second sensor signals 112B generated during the second maneuver. By performing the second maneuver, for example, which may be a predetermined maneuver, the sensor anomaly detector 138 and/or the sensor system 136 may be configured to identify the anomalous sensor based at least in part on one or more of the sensor signals 302A-302N by comparing the one or more sensor signals 302A-302N to the previous correlations for the given maneuver. Any of the one or more sensor signals 302A-302N deviating from the expected sensor signals may indicate that such sensor signals are inaccurate and that the corresponding sensor(s) are anomalous sensor(s).

In some examples, the sensor system 136 may be used to recalibrate a sensor that is generating signals indicative of a lack of, or change in, calibration. For example, the first sensor 112A may be identified as the anomalous sensor, and the first sensor 112A may be identified as lacking calibration. For example, the first sensor 112A may be a camera, and the camera may have become misaligned relative to its original orientation on the UAV 102, thereby resulting in the camera no longer being calibrated. In some such examples, the vehicle controller 132 may be configured to cause the UAV 102 to perform a maneuver, for example, a predetermined maneuver, and the sensor anomaly detector 138 and/or the sensor system 136 may be configured to recalibrate the first sensor 112A based at least in part on a previous correlation between the first sensor signals 302A and the second sensor signals 302B (and/or any of the other sensor signals 302C-302N), the first sensor signals 302A generated during the maneuver, and the second sensor signals 302B generated during the maneuver. For example, the maneuver may be rolling the UAV 102 to the right for a predetermined amount of time. In some examples, if one or more of the sensors 112A-112N are determined to be generating inaccurate sensor data, the sensor data from the one or more anomalous sensors may be ignored or the sensor data may be discounted, for example, based on a confidence score associated with the respective sensor data. In some examples, the respective confidence scores may be determined by the anomalous sensor model 220, and the lower the confidence score, the greater the amount of discounting of the sensor data when used by the vehicle control system 132 and/or the navigation module 122.

Figure 4:
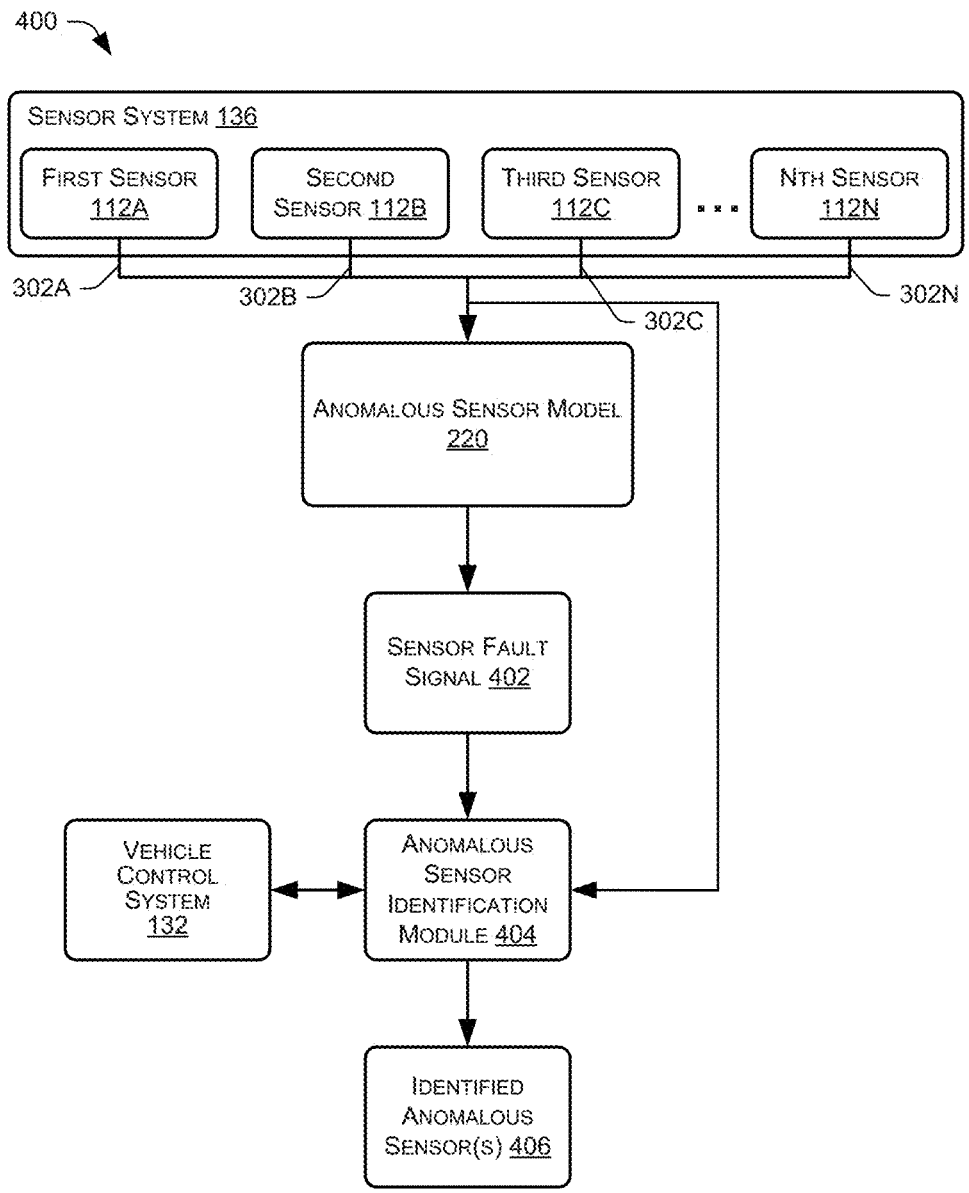
FIG. 4 is a block diagram of an illustrative architecture of an illustrative sensor system and an illustrative anomalous sensor model that may be used for identifying anomalous sensors generating inaccurate sensor data.

FIG. 4 is a block diagram of an example architecture 400 of an illustrative sensor system 136 and an illustrative anomalous sensor model 220 that may be used for determining that one or more of the sensors 112A-112N is generating inaccurate sensor data, in response to which a sensor fault signal 402 may be generated, for example, by the sensor anomaly detector 138 and/or the sensor system 136. In the example shown, the sensor fault signal 4042 may be received by an anomalous sensor identification module 404, which may be configured to identify the one or more sensors generating inaccurate sensor data (e.g., the identified anomalous sensor(s) 406), for example, as described herein. In some examples, the anomalous sensor identification module 404 may be part of the sensor system 136, the sensor anomaly detector 138, and/or the vehicle control system 132. In some examples, the anomalous sensor identification module 404 may be independent from one or more of the sensor system 136, the sensor anomaly detector 138, and/or the vehicle control system 132.

As shown in FIG. 4, the anomalous sensor model 220 may be configured to receive sensor signals 302A-302N from respective sensors 112A-112N indicative of operation of the UAV 102 and/or the environment through which the UAV 102 travels. As described herein, the anomalous sensor model 220, in some examples, may be configured to determine, based on one or more of the sensor signals 302A-302N, that one or more of the respective sensors 112A-112N is an anomalous sensor generating inaccurate sensor data (e.g., is not generating sensor data and/or is generating sensor data inconsistent with sensor data that would be expected if the sensor(s) is/are operating properly). For example, the anomalous sensor model 220 may include a mathematical model trained via machine learning. For example, the anomalous sensor model may leverage one or more of supervised or semi-supervised learning, reinforcement learning, feature learning, anomaly detection learning, decision tree learning, association rule learning, and/or take the form of an artificial neural network, a support vector machine, and/or genetic algorithms. In some examples, the anomalous sensor model 220 may be configured to receive one or more of the sensor signals 302A-302N from the respective sensors 112A-112N, and determine, based at least in part on the one or more sensor signals 302A-302N, that one or more of the respective sensors 112A-112N is an anomalous sensor generating inaccurate sensor data. In some examples, the anomalous sensor model 220 may generate a confidence level representative of a probability that either (1) there is an inconsistency in the sensor data indicative of inaccurate sensor data generated by one or more of the sensors, or (2) the sensor data is consistent and indicative of a lack of inaccurate sensor data generated by the sensors. In some examples, the confidence level may be represented as a percentage and/or another scoring paradigm. In some examples, the anomalous sensor model 220, the sensor anomaly detector 138, and/or the sensor system 136 may be configured to generate the sensor fault signal 402 indicative of the one or more anomalous sensors. In some examples, the sensor fault signal 402 may be generated based on the confidence level exceeding, or falling below, a threshold confidence level, and in some examples, the threshold confidence level may be tailored to a desired safety factor and/or other considerations.

In some examples, upon generation of the sensor fault signal 402, the anomalous sensor identification module 404 may be configured to identify the one or more anomalous sensors. For example, the anomalous sensor identification module 404 may be configured to receive the sensor fault signal 402 and one or more of the sensor signals 302A-302N, and based at least is part on one or more of those signals, identify the one or more anomalous sensors. For example, the anomalous sensor identification module 404 may be configured to determine a characteristic associated with operation of the UAV 102 based on sensor data from one or more of the sensor signals 302A-302N. For example, the characteristic associated with the operation of the vehicle may include a vehicle maneuver (e.g., taking-off, landing, ascending, descending, traveling forward or backward, rolling to the right, rolling to the left, pitching forward, pitching backward, yawing left, and/or yawing right) and/or a change in power output, a change in payload, etc. In some examples, the anomalous sensor identification module 404 may associate the data received with correlations between data received from one or more of the sensors 112A-112N, for example, as described herein. In some examples, the anomalous sensor identification module 404 may be configured to use the characteristic associated with operation of the UAV 102 to determine expected signals associated with the characteristic associated with the operation. In some examples, the anomalous sensor identification module 404 may associate the characteristic associated with the operation of the UAV 102 with historically-derived correlations between the characteristic and the sensor signals 302A-302N during normal (e.g., proper and/or accurate) operation of the sensors 112A-112N. For example, during the various operations of the UAV 102, actual signals associated with sensor signals 302A-302N received from the respective sensors 112A-112N may be received and stored to create a database of correlations between the characteristics associated with operation of the UAV 102 and the sensor signals 302A-302N received from the respective sensors 112A-112, so that for a given characteristic associated with operation, expected signals associated with the sensors 112A-112N may be determined. In some examples, the signals 302A-302N associated with maneuvering and/or operation the UAV 102 may be indicative of the performance of the respective sensors 112A-112N.

In some examples, the anomalous sensor identification module 404 may also be configured to compare the two sets of respective signals (expected and actual) and determine differences between the two sets of respective signals. In some examples, the anomalous sensor identification module 404 may be configured to determine differences for the respective signals between the expected signals and the actual signals and determine which of the one or more sensors 112A-112N is the anomalous sensor generating inaccurate sensor data. For example, if the difference is greater than a predetermined threshold, the anomalous sensor identification module 404 may be configured to identify a fault with the respective sensor(s) 112A-112N associated with the difference.

Figure 5:
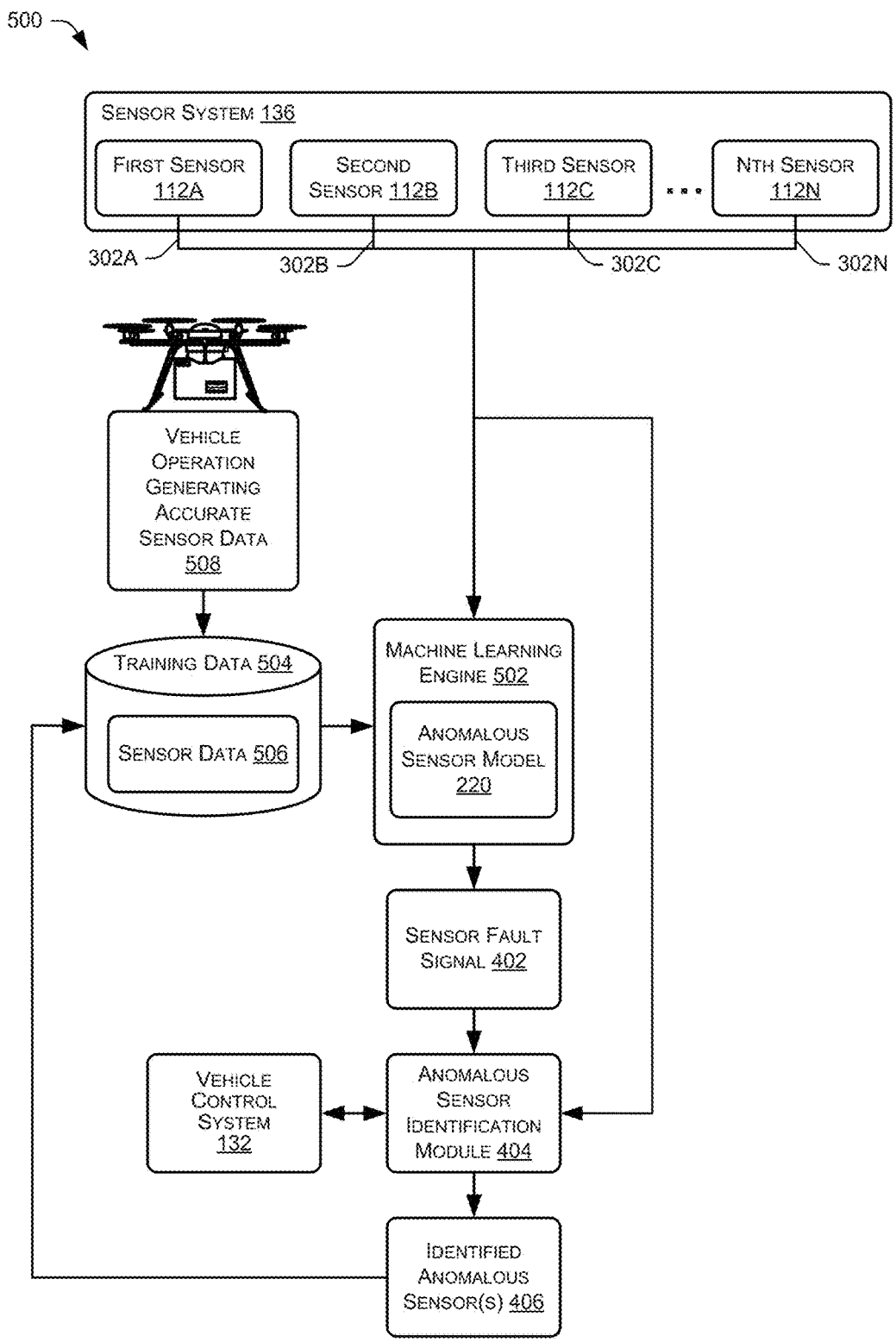
FIG. 5 is a block diagram of an illustrative architecture of an illustrative sensor system and an illustrative anomalous sensor model that may be used for identifying anomalous sensors generating inaccurate sensor data that leverages a machine learning engine to train the anomalous sensor model.

FIG. 5 is a block diagram of an example architecture 500 of an illustrative sensor system 136 and an illustrative anomalous sensor model 220 that may be used for identifying anomalous sensors generating inaccurate sensor data that leverages a machine learning engine 502 to train the anomalous sensor model 220. For example, the anomalous sensor model 220 may be trained with training data 504 to detect that one or more of the sensors 112A-112N is an anomalous sensor generating inaccurate sensor data. For example, the training data 504 may include sensor data 506. For example, the training data 504 may include sensor signals from various types of sensors recorded or otherwise stored during normal operation of a UAV 102. For example, a plurality of sensors may be coupled to a UAV, and the UAV may be operated through various maneuvers and operations, during which the sensors generate respective sensor signals including sensor data 506. For example, sensors, such as a temperature sensor, an optical sensor, a location sensor (e.g., a GPS, an IMU, an accelerometer, a gyroscope, a laser sensor, a SONAR sensor, a RADAR sensor), and/or a pressure sensor (e.g., an altimeter) may be coupled to the UAV, and each of the sensors may generate respective sensor signals during the maneuvering and operation of the UAV. For example, a camera, a GPS, and an IMU may concurrently generate respective sensor signals during a flight sequence of the UAV, and thus create historical sensor data associated with the maneuvers and operations of the UAV during the flight sequence. The sensor signals may be stored and/or recorded, and, in some examples, each of the respective sets of sensor signals may be temporally aligned with one another, and/or temporally aligned with the maneuvers and operations of the UAV, such as, for example, increasing power output, changing payload, charging batteries, etc. For example, the machine learning engine 502 may leverage the training data 504 to develop the anomalous sensor model 220.

Once trained, the anomalous sensor model 220 may be configured to receive respective sensor signals 302A-302N from one or more of the respective sensors 112A-112N and determine whether there is a fault with one or more of the sensors 112A-112N. In some examples, the anomalous sensor model 220 may generate a confidence level representative of a probability that either (1) there is an inconsistency in the sensor data indicative of inaccurate sensor data generated by one or more of the sensors 112A-112N, or (2) the sensor data is consistent and indicative of a lack of inaccurate sensor data generated by the sensors 112A-112N. In some examples, the confidence level may be represented as a percentage and/or another scoring paradigm. In some examples, the sensor anomaly detector 138 and/or the sensor system 136 may also be configured to generate the sensor fault signal 402 indicative of the one or more anomalous sensors. In some examples, the sensor fault signal 402 may be generated based on the confidence level exceeding, or falling below, a threshold confidence level, and in some examples, the threshold confidence level may be tailored to a desired safety factor and/or other considerations.

In addition, once the anomalous sensor model 220 has detected a fault with one or more of the anomalous sensors, the data associated with the detection (e.g., data associated with the identified anomalous sensor(s) 406) may be input into the training data 504, so that the machine learning engine 502 may update the anomalous sensor model 220 with the data to improve the accuracy of the anomalous sensor model 220 for future determinations. In this example manner, machine learning may be used to improve the accuracy of the detection of faults associated with the one or more sensors 112A-112N. Machine learning may generally refer to a broad class of such algorithms in which an output is generated based on learned parameters. In some examples, an example machine learning algorithm that may be used to determine correlations and/or related relationships is an artificial neural network (ANN). ANNs are biologically inspired algorithms, which pass input data through a series of connected layers to produce an output. Each layer in a ANN may include any number of layers, and may also include another ANN. The manner in which the various layers of an ANN are connected to one another is generally referred to as an architecture of the ANN. Other types of networks (e.g., neural networks) are contemplated. In some examples, the anomalous sensor model 220 may leverage one or more of supervised or semi-supervised learning, reinforcement learning, feature learning, anomaly detection learning, decision tree learning, association rule learning, and/or take the form of an artificial neural network, a support vector machine, and/or genetic algorithms.

Figure 6:
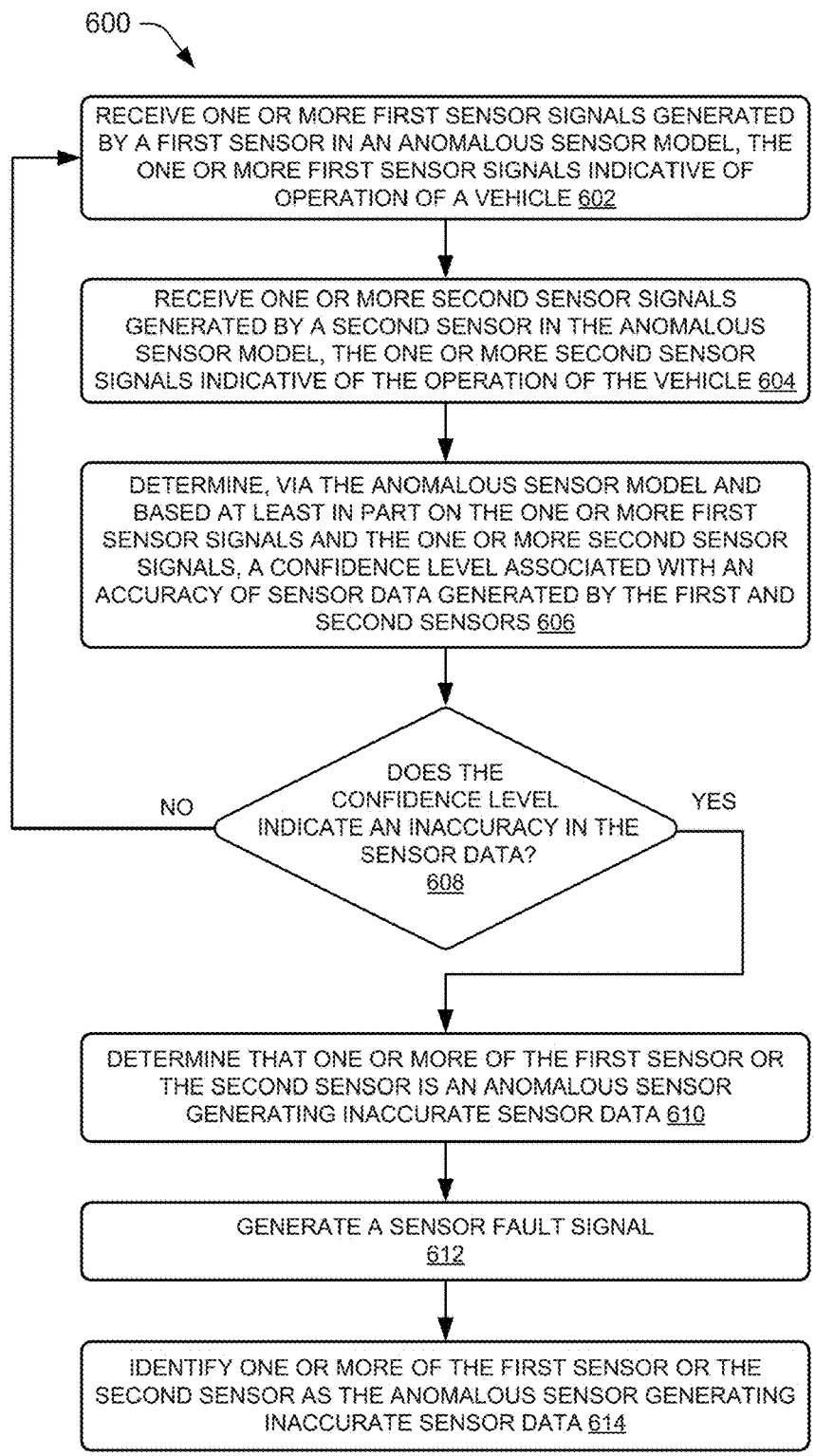
FIG. 6 is a flow diagram of an illustrative process for identifying an anomalous sensor associated with a vehicle.

FIG. 6 is a flow diagram of an illustrative process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an illustrative process 600 for identifying an anomalous sensor generating inaccurate sensor data. The process 600 may be implemented in the environment 100 and by the UAV architectures 200, 300, 400, and 500 described above, or in other environments and architectures.

The illustrative process 600, at 602, may include receiving one or more first sensor signals generated by a first sensor in an anomalous sensor model. For example, the one or more first sensor signals may be indicative of operation of a vehicle and/or an environment through which the vehicle is travelling. For example, the vehicle may be a UAV, and the sensor may be a temperature sensor, an optical sensor (e.g., a single lens camera, a stereo camera, a multi-lens camera, a digital still camera, a red green blue (RGB) camera, a video camera, a thermographic camera, an infrared sensor or camera), a location sensor (e.g., a global positioning system (GPS)), an inertial measurement unit (IMU), an accelerometer, a gyroscope, a laser sensor (e.g., light detection and ranging (LIDAR) sensor), a sound navigation and ranging (SONAR) sensor, a radio detection and ranging (RADAR) sensor, or a pressure sensor (e.g., an altimeter).

At 604, the example process 600 may include receiving one or more second sensor signals generated by a second sensor in the anomalous sensor model. The one or more second sensor signals may be indicative of the operation of the vehicle and/or the environment through which the vehicle is travelling. For example, the one or more second sensor signals may be generated by one or more of the sensor types noted above with respect to the first sensor at 602. In some examples, the anomalous sensor model may be a mathematical model, for example, as described herein, and may be configured to be trained by a machine learning engine using training data including accurate sensor signals generated by the types of sensors described herein during operation of the vehicle, which may be a UAV.

At 606, the example process 600 may include determining, via the anomalous sensor model and based at least in part on the one or more first sensor signals and the one or more second sensor signals, a confidence level associated with an accuracy of sensor data generated by the first and second sensors, for example, as described herein.

The example process 600, at 608, may include determining whether the confidence level indicates an inaccuracy in the sensor data received from the first sensor and the second sensor, for example, as described herein. For example, based on the one or more first sensor signals and the one or more second sensor signals, the anomalous sensor model may generate a confidence level representative of a probability that either (1) there is an inconsistency in the sensor data indicative of inaccurate sensor data generated by one or more of the sensors, or (2) the sensor data is consistent and indicative of a lack of inaccurate sensor data generated by the sensors. In some examples, the confidence level may be represented as a percentage and/or another scoring paradigm. In some examples, if the confidence level exceeds a threshold confidence level, this may be an indication that there is inconsistency in the sensor data indicative of inaccurate sensor data generated by one or more of the sensors. In some such examples, if the confidence level falls below a threshold confidence level, this may be an indication that there is a lack of inconsistency in the sensor data indicative of inaccurate sensor data generated by one or more of the sensors. Alternatively, in some examples, if the confidence level exceeds a threshold confidence level indicative of consistent sensor data, this may be an indication that there is a lack of inconsistency in the sensor data, and the sensor data is accurate sensor data. As noted herein, the threshold confidence level may be tailored to a desired safety factor and/or other considerations. For example, if it is critically important that inaccurate sensor data be identified, for example, if the vehicle is a UAV and inaccurate sensor data may lead to the UAV crashing, the threshold confidence level may be tailored to identify inaccurate sensor data relatively lower confidence levels (i.e., if a higher confidence level is indicative of a greater likelihood of inaccurate sensor data).

If at 608, it is determined that the confidence level is not indicative of an inaccuracy in the sensor data, the example process 600 may revert back to 602, for example, such that the process 600 continues to repeat while monitoring the sensor signals. If, however, at 608 it is determined that the confidence level is indicative of an inaccuracy in the sensor data, at 610, the example process 600 may determine that one or more of the first sensor or the second sensor is an anomalous sensor generating inaccurate sensor data.

At 612, the example process 600 may include generating a sensor fault signal, for example, indicative the one or more of the first sensor or the second sensor is generating inaccurate sensor data, for example, as described herein.

The example process 600, at 614, may include identifying which of the first sensor and/or the second sensor is the anomalous sensor generating inaccurate sensor data. This may be determined, for example, by any of the example processes described herein. For example, the process 600 may include monitoring the first sensor signals during a first time period, monitoring the first sensor signals during a second time period, and determining a first sensor signal difference between the first sensor signals during the first time period and the first sensor signals during the second time period, and identifying the first sensor as the anomalous sensor based at least in part on the first sensor signal difference being greater than a threshold magnitude, for example, as described herein. In some examples, identifying one or more of the first sensor, the second sensor, or a third sensor as the anomalous sensor may include monitoring during a first time period the first sensor signals and the second sensor signals (e.g., while not monitoring third sensor signals from the third sensor), monitoring during a second time period the second sensor signals and third sensor signals indicative of the operation of the vehicle (e.g., while not monitoring the first sensor signals), monitoring during a third time period the first sensor signals and the third sensor signals (e.g., while not monitoring the second sensor signals), and identifying one or more of the first sensor, the second sensor, or the third sensor as the anomalous sensor generating inaccurate sensor data, based at least in part on the monitoring during the first time period, the monitoring during the second time period, and the monitoring during the third time period. In this example manner, the process 600 may use a process of elimination to identify a sensor from among a plurality of sensors that is generating inaccurate sensor data. In some examples, this may be extended to identify more than a single sensor that is generating inaccurate sensor data, for example, as described herein.

In some examples, the process 600 may include causing, upon generation of the sensor fault signal, the vehicle to maneuver, and identifying the anomalous sensor based at least in part on the first sensor signals and the second sensor signals generated during the maneuver.

Some examples of the process 600 may also include recalibrating the anomalous sensor based at least in part on a previous correlation between the anomalous sensor the one or more other sensors coupled to vehicle and generating sensor data. For example, the process 600 may include causing the vehicle to perform a maneuver and recalibrating the first sensor based at least in part on the previous correlation, the first sensor signals generated during the maneuver, and second sensor signals generated during the maneuver (and, in some examples, based on additional sensor signals generated by other sensors), for example, as described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. An unmanned aerial vehicle (UAV) comprising:
a vehicle controller configured to receive sensor signals from a sensor system and control operation of the UAV; and
the sensor system in communication with the vehicle controller, the sensor system comprising:

a first sensor coupled to the UAV and configured to generate first sensor signals indicative of operation of the UAV;

a second sensor coupled to the UAV and configured to generate second sensor signals indicative of the operation of the UAV; and a sensor anomaly detector in communication with the first sensor and the second sensor, the sensor anomaly detector comprising an analytical sensor model configured to:

receive the first sensor signals and the second sensor signals; and determine that one or more of the first sensor or the second sensor is an anomalous sensor generating inaccurate sensor data, wherein the sensor anomaly detector is configured to:

generate a sensor fault signal indicative of the anomalous sensor; and identify the anomalous sensor, wherein the vehicle controller is configured to receive the sensor fault signal and control operation of the UAV based on the sensor fault signal;

wherein the vehicle controller is configured to cause the UAV to perform a maneuver, and wherein the sensor anomaly detector is configured to confirm the anomalous sensor based on at least one of the first sensor signals generated during the maneuver or the second sensor signals generated during the maneuver.

2. The UAV of claim 1, wherein the analytical sensor model comprises a mathematical model trained via machine learning and training data comprising sensor data generated prior in time during operation of a UAV by a plurality of sensors coupled to the UAV.

3. The UAV of claim 1, wherein the vehicle controller, upon receipt of the sensor fault signal, is configured to one of prevent take-off of the UAV or cause the UAV to land.

4. The UAV of claim 1, wherein the sensor system further comprises a third sensor coupled to the UAV and configured to generate third sensor signals indicative of the operation of the UAV, and wherein the sensor anomaly detector is configured identify as the anomalous sensor one of the first sensor, the second sensor, or the third sensor, wherein identifying the anomalous sensor comprises:

monitoring, during a first time period, the first sensor signals and the second sensor signals;

monitoring, during a second time period, the second sensor signals and the third sensor signals;

monitoring, during a third time period, the first sensor signals and the third sensor signals; and identifying one or more of the first sensor, the second sensor, or the third sensor as the anomalous sensor generating the inaccurate sensor data, based on the monitoring during the first time period, the monitoring during the second time period, and the monitoring during the third time period.

5. The UAV of claim 1, wherein generating the sensor fault signal is based on a confidence level associated with at least one of the first sensor signals or the second sensor signals meeting or exceeding a threshold confidence level, wherein the threshold confidence level is based on one or more correlations associated with third sensor signals generated by the first sensor or the second sensor during prior operation of the UAV.

6. The UAV of claim 1, where determining that the one or more of the first sensor or the second sensor is the anomalous sensor generating the inaccurate sensor data comprises:

determining expected sensor signals expected to be generated by the first sensor or the second sensor, the expected sensor signals being based on first previous operation of the UAV or second previous operation of a different UAV;

comparing the expected sensor signals to at least one of the first sensor signals or the second sensor signals; and determining that a difference between the expected sensor signals and the at least one of the first sensor signals or the second sensor signals meets or exceeds a threshold amount.

7. A sensor system for a vehicle, the sensor system comprising:

a first sensor configured to be coupled to the vehicle and generate one or more first sensor signals indicative of operation of the vehicle;

a second sensor configured to be coupled to the vehicle and generate one or more second sensor signals indicative of the operation of the vehicle; and a sensor anomaly detector in communication with the first sensor and the second sensor, the sensor anomaly detector comprising an anomalous sensor model configured to:

receive the one or more first sensor signals and the one or more second sensor signals;

determine, based at least in part on at least one of the one or more first sensor signals or the one or more second sensor signals, that one or more of the first sensor or the second sensor is an anomalous sensor generating of inaccurate sensor data, wherein the sensor anomaly detector is configured to generate a sensor fault signal indicative of the anomalous sensor and cause the vehicle to perform a maneuver and recalibrate the anomalous sensor based at least in part on the maneuver.

8. The sensor system of claim 7, wherein the anomalous sensor model comprises mathematical model trained via machine learning and training data comprising sensor data generated prior in time during operation of a UAV by a plurality of sensors coupled to the UAV.

9. The sensor system of claim 7, further comprising a third sensor configured to be coupled to the vehicle and generate one or more third sensor signals indicative of the operation of the vehicle, and wherein the sensor anomaly detector is configured to identify as the anomalous sensor one of the first sensor, the second sensor, or the third sensor, wherein identifying the anomalous sensor comprises:

monitoring, during a first time period, the one or more first sensor signals and the one or more second sensor signals;

monitoring, during a second time period, the one or more second sensor signals and the one or more third sensor signals;

monitoring, during a third time period, the one or more first sensor signals and the one or more third sensor signals; and identifying one or more of the first sensor, the second sensor, or the third sensor as the anomalous sensor generating the inaccurate sensor data, based at least in part on the monitoring during the first time period, the monitoring during the second time period, and the monitoring during the third time period.

10. The sensor system of claim 9, wherein one or more of the first time period, the second time period, or the third time period at least partially overlap.

11. The sensor system of claim 9, wherein identifying the anomalous sensor further comprises:
  determining that the one or more first sensor signals are inconsistent with the one or more second sensor signals during the first time period;
  determining that the one or more first sensor signals are inconsistent with the one or more third sensor signals during the third time period;
  determining that the one or more second sensor signals are consistent with the one or more third sensor signals during the second time period; and
  identifying the first sensor as the anomalous sensor generating the inaccurate sensor data.

12. The sensor system of claim 7, wherein identifying one or more of the first sensor or the second sensor as the anomalous sensor generating the inaccurate sensor data comprises:
  monitoring the one or more first sensor signals during a first time period;
  monitoring the one or more first sensor signals during a second time period;
  determining a first sensor signal difference between the one or more first sensor signals during the first time period and the one or more first sensor signals during the second time period; and
  identifying the first sensor as the anomalous sensor based at least in part on the first sensor signal difference being greater than a threshold magnitude.

13. The sensor system of claim 7, wherein the first sensor comprises one of a temperature sensor, an optical sensor, a global positioning system (GPS), an inertial measurement unit (IMU), an accelerometer, a gyroscope, a laser sensor, a sound navigation and ranging (SONAR) sensor, a radio detection and ranging (RADAR) sensor, or a pressure sensor, and wherein the second sensor comprises one of a temperature sensor, an optical sensor, a GPS, an IMU, an accelerometer, a gyroscope, a laser sensor, a SONAR sensor, a RADAR sensor, or a pressure sensor.

14. The sensor system of claim 7, wherein the one or more first sensor signals comprise first sensor data indicative of a first second maneuver of the vehicle and the one or more second sensor signals comprise second sensor data indicative of the second maneuver of the vehicle, and wherein the sensor anomaly detector is configured to determine that the first sensor data is inconsistent with the second sensor data.

15. The sensor system of claim 14, further comprising:
  a vehicle controller in communication with the sensor system and configured to control operation of the vehicle, wherein the vehicle controller is further configured to:
  receive the sensor fault signal;
  wherein the sensor anomaly detector is configured to identify the anomalous sensor based at least in part on the one or more first sensor signals generated during the second maneuver and the one or more second sensor signals generated during the second maneuver.

16. A method comprising:
  receiving one or more first sensor signals generated by a first sensor in an analytical sensor model, the one or more first sensor signals indicative of operation of a vehicle;
  receiving one or more second sensor signals generated by a second sensor in the analytical sensor model, the one or more second sensor signals indicative of the operation of the vehicle;
  determining, via the analytic sensor model and based at least in part on at least one of the one or more first sensor signals or the one or more second sensor signals, that one or more of the first sensor or the second sensor is an anomalous sensor generating inaccurate sensor data; and
  causing the vehicle to maneuver and recalibrating the anomalous sensor based at least in part on the maneuver.

17. The method of claim 16, wherein the first sensor comprises the anomalous sensor and the method further comprises:
  recalibrating the first sensor based at least in part on the one or more first sensor signals generated during the maneuver, and the one or more second sensor signals generated during the maneuver.

18. The method of claim 16, further comprising:
  generating a sensor fault signal indicative of the anomalous sensor;
  causing, upon generation of the sensor fault signal, the vehicle to perform the maneuver; and
  identifying the anomalous sensor based at least in part on the one or more first sensor signals and the one or more second sensor signals generated during the maneuver.

19. The method of claim 16, wherein the method further comprises:
  monitoring the one or more first sensor signals during a first time period;
  monitoring the one or more first sensor signals during a second time period;
  determining a first sensor signal difference between the one or more first sensor signals during the first time period and the one or more first sensor signals during the second time period; and
  identifying the first sensor as the anomalous sensor based at least in part on the first sensor signal difference being greater than a threshold magnitude.

20. The method of claim 16, further comprising:
  monitoring, during a first time period, the one or more first sensor signals and the one or more second sensor signals;
  monitoring, during a second time period, the one or more second sensor signals and one or more third sensor signals indicative of the operation of the vehicle;
  monitoring, during a third time period, the one or more first sensor signals and the one or more third sensor signals; and
  identifying one or more of the first sensor, the second sensor, or the third sensor as the anomalous sensor generating the inaccurate sensor data, based at least in part on the monitoring during the first time period, the monitoring during the second time period, and the monitoring during the third time period.

* * * * *